INVENTORS
ARTHUR C. HEEHLER
ALBERT E. GANZERT
BY
ATTORNEYS

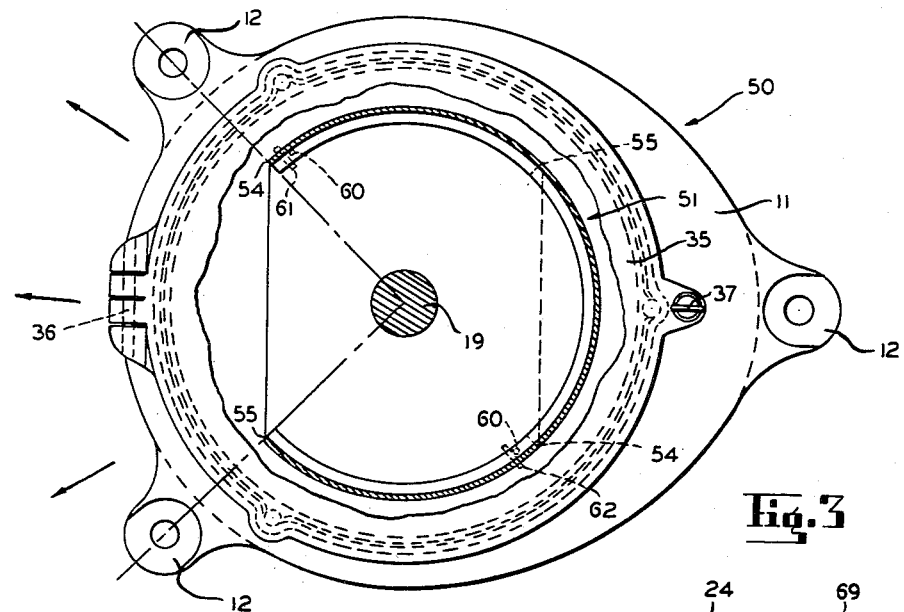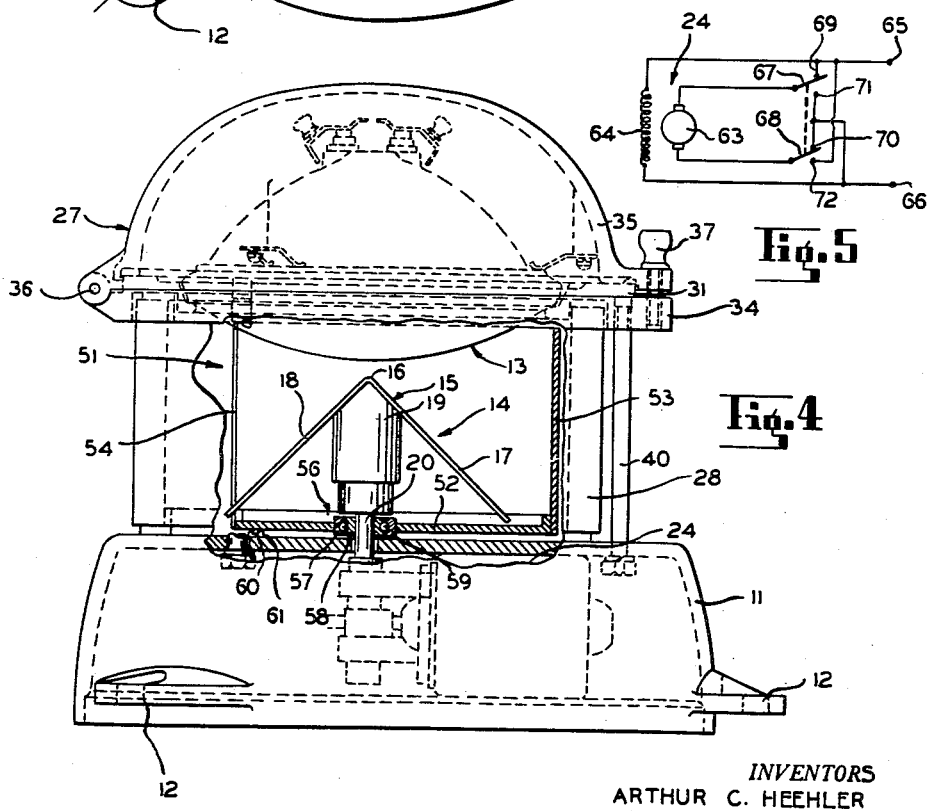

United States Patent Office 2,846,663
Patented Aug. 5, 1958

2,846,663

WARNING LIGHT

Arthur C. Heehler, Park Ridge, and Albert E. Ganzert, Chicago, Ill., assignors to The Pyle-National Company, Chicago, Ill., a corporation of Illinois Application August 23, 1955, Serial No. 530,016

6 Claims. (Cl. 340—50)

This invention relates to a warning or signal light and more particularly to a warning light of the flashing type which is of compact, rugged construction and efficient and reliable in operation.

In the warning light of this invention, a rotating reflector unit is utilized to project a beam of light which sweeps through 360° as the unit is rotated, so that an observer at any point in the path of the beam will see one or more flashes during each rotation of the reflector unit.

The rotating reflector unit could be designed to concentrate light from a light source into a beam but such would require a cumbersome construction and mounting of the unit and the light source and preferably, the light is concentrated into a beam by a stationary reflector and the reflector unit is rotated about an axis coinciding with the center line of the beam so formed. This is of particular advantage because it permits use of the high efficiency sealed beam units in a stationary mounting with no slip rings or the like being necessary for electrical energization of the light source.

For signal lights located adjacent the ground, as on railroad cars or automobiles as well as in many other uses, it is usually desirable that the path of travel of the beam be substantially in one plane, rather than in a conical path, and the reflector unit preferably has one or more reflecting surfaces at a 45° angle to the beam. In general, the number of reflecting surfaces will depend upon the desired range of the signal light, the desired frequency of the flashes and practical consideration relating to the drive speed of the reflector unit and the intensities of available light sources. Preferably, a generally circular plate is bent at right angles along a diametrical line with the bend line being disposed as close to the light source as possible and with the bend line extending transversely through the center line of the beam so that the surface of each half of the plate is at a 45° angle to the beam. With this arrangement, the reflector unit is readily constructed and the overall size of the light is at a minimum.

In many applications, it is desirable to support the warning light on a surface such as the top of an automobile or the top of a railroad car. In accordance with a specific feature of this invention, the signal light comprises a hollow base arranged to be disposed with one side thereof against a supporting surface and a shaft is journalled in the base for rotation about its axis and projects from the opposite side of the base, the reflector unit being mounted on the shaft. A drive motor, preferably an electric motor, is disposed within the base and is coupled to the shaft. Preferably, the shaft of the drive motor carries a worm which is meshed with a worm wheel secured to the shaft. With this arrangement, the unit is as compact as possible and the motor may operate at a high speed without driving the shaft at an excessive speed.

In accordance with a further feature of the invention, a cylindrical shield of light-transmitting material is disposed on the base in coaxial relation to the reflector-supporting shaft and a support frame is supported in spaced relation to the base by the shield, the frame being arranged to support the light source to project a beam of light toward the reflector unit. Preferably, resilient gaskets are respectively disposed between the shield and the base and between the frame and the shield, and means are provided for adjustably moving the frame toward the base.

In accordance with a further feature, at least one hollow tube or rod is used for supporting the light source from the base, and one or more wires extend through such rod for energization of the light source.

As above indicated, it is a feature of this invention that a sealed beam unit is used in a stationary mounting with no slip rings or the like being necessary for electrical energization. A specific feature of the invention relates to the mounting of the sealed beam unit. In particular, a ring is supported in spaced relation from the base in a plane transverse to the axis of rotation of the reflector unit, the ring having an opening coaxially related to such axis with such opening being of slightly smaller diameter than the annular rim of the sealed beam unit. Releasable means are provided for resiliently holding the sealed beam unit seated in the opening of the ring. Preferably, a generally cup-shaped cover is releasably secured, as through a hinge connection, on the ring and resilient means are secured to the cover for engaging and holding the sealed beam unit seated in the opening of the ring.

In many warning light applications, it is desirable to project a flashing light beam only in a certain direction or certain directions. According to a specific feature of this invention, a shutter is supported for rotation about the axis of rotation of a continuously rotatable beam-projecting unit and means are provided for drivingly coupling the shutter to the unit to move the shutter to a desired location, the drive means thus serving to move the shutter as well as the beam-projecting unit. In a suitable releasable clutch means may be used for the drive coupling.

In most cases, it is only necessary to be able to selectively position the shutter at only one or two particular positions. In signal lights for railroad cars, for example, it is oftentimes desirable to position the shutter so that the light is projected in a forward or rearward direction only.

According to still another feature of this invention, a friction clutch is used between the beam-projecting unit and the shutter (i. e. a drive coupling which will transmit a limited amount of torque) and stop means are provided for limiting rotation of the shutter in at least one direction. Thus, by reversing the direction of drive of the beam-projecting unit, the shutter may be moved into and out of a particular position. If desired, the shutter could move with the beam-projecting unit in one direction of rotation so as not to interfere with the beam while being stopped at a particular position in the reverse direction of rotation. For selectively positioning the shutter in one of two alternate positions, first stop means may be provided to limit rotation in one direction with second stop means provided to limit rotation in the reverse direction, so that the position of the shutter is controlled by the direction of rotation of the beam-projecting unit. A suitable reversible electric motor is preferably provided as the drive means for the beam-projecting unit.

It will thus be appreciated that this invention provides an efficient and reliable signal or warning light of rugged, compact construction which utilizes a continuously rotatable unit to sweep a beam or beams of light through 360° or only in a particular direction or directions as desired, and which may use a stationary sealed beam unit without requiring any slip rings or the like for electrical energization.

An object of this invention, accordingly, is to provide an improved warning light.

Another object of this invention is to provide an improved warning light in which a beam or beams of light are swept through 360°, a stationary sealed beam unit being used without requiring any slip rings or the like for electrical energization.

A further object of this invention is to provide an improved warning light in which a beam may be projected only in a selected direction or directions from a continuously rotating projecting unit.

This invention contemplates other and more specific objects, features and advantages which will become more fully apparent from the following detailed description taken in conjunction with the accompanying drawings which illustrate preferred embodiments and in which:

Figure 3 is a plan view, partly in section, of a modified form of warning light constructed in accordance with the principles of this invention;

Figure 4 is an elevational view, partly in section, of the warning light of Figure 3; and Figure 5 is a schematic electrical diagram illustrating the manner of energization of the motor of the warning light of Figures 3 and 4.

Figure 1:
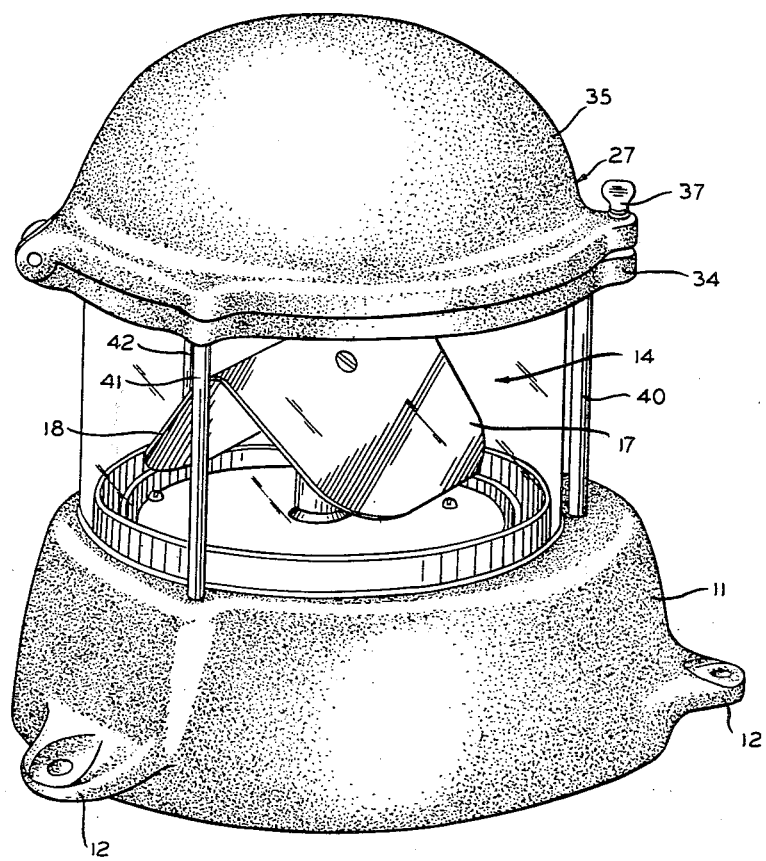
Figure 1 is a perspective view of a warning light constructed in accordance with the principles of the present invention.
Figure 2:
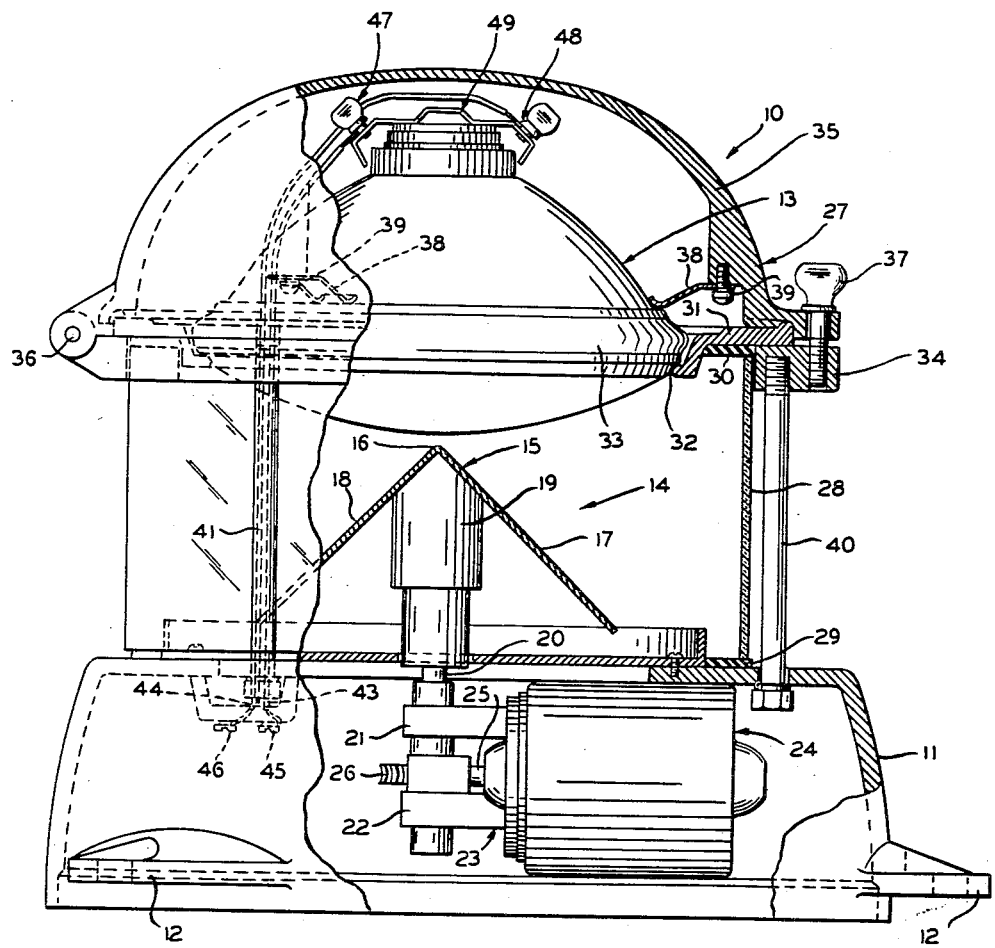
Figure 2 is an elevational view, partly in section, of the warning light of Figure 1.

Reference numeral 10 generally designates a warning light constructed according to the principles of this invention. The warning light 10 comprises a base 11 which is especially designed to be mounted on a flat supporting surface such as the top of a railroad car or automobile, lugs 12 being provided for this purpose. The warning light 10 could be operated in any position but is designed to be operated and normally is operated with the base 11 secured on a horizontal supporting surface. For convenience, the light will be described with respect to its normal position, it being understood that terms such as "horizontal," "vertical," "above" and "below" are used in a relative sense only.

In the normal position of the light 10, a conventional sealed beam unit 13 projects a beam of light downwardly against a reflector unit 14 which comprises a plate 15 of polished metal or the like bent along a line 16 into two sections 17 and 18, the plate 15 thus having an inverted V configuration with the sections 17 and 18 at 45° angles to the horizontal or vertical. It should be noted that the bend line 16 is located closely adjacent the sealed beam unit 13 and extends transversely through the serve line of the light beam projected from the sealed beam unit 13.

It will be appreciated that with this construction, one-half of the beam projected from the unit 13 is projected horizontally from the reflecting surface of the section 17 in one direction and the other half of the beam is similarly projected horizontally in the opposite direction from the reflecting surface of the section 18.

The reflector unit 14 is carried by the base 11 for rotation about a vertical axis coinciding with the center line of the beam projected from the unit 13. In particular, the plate 15 is secured on the upper end of a hub member 19 which is secured to and effectively forms a part of a vertical shaft 20 which is suitably journalled in vertically spaced horizontal arms 21 and 22 of a bracket 23 which is affixed to an electric motor 24, the motor 24 in turn being secured within the base 11. The motor 24 has a drive shaft 25 which carries a worm, not shown, meshed with a worm wheel 26 affixed to the shaft 20 between the arms 21 and 22.

The sealed beam unit 13 is supported in a frame or housing generally designated by reference numeral 27 which is supported from the base 11 through a cylindrical shield 28 of light-transmitting material such as glass which may be clear, red or any other color as may be desired. An annular gasket 29 of resilient material such as rubber is preferably provided between the lower end of the shield 28 and the upper surface of the bracket 11, and a similar annular gasket 30 is preferably disposed between the upper end of the shield 28 and the frame or housing 27.

The frame or housing 27 comprises a ring 31 having an opening 32 of slightly smaller diameter than a conventional annular bead 33 of the sealed beam unit 13, so that the unit 13 seats in the opening 32. The beam unit mounting ring 31 is disposed between a ring 34 and the rim of an inverted cup-shaped cover 35 which is hinged to the ring 34 through a horizontal hinge pin 36 with a thumb screw 37 being provided to releasably lock the cover member 35 to the ring 34 and to clamp the beam unit support ring 31 therebetween.

When the cover 35 is disposed in its closed position as illustrated, resilient means in the form of leaf-spring members 38 engage the top side of the sealed beam unit 13 to hold the same seated in the opening 32 of the mounting ring 31. The spring members 38 are secured to the cover 35 by screws 39.

In addition to being supported from the base 11 through the shield 28, the frame or housing 27 is supported from the base 11 through rods 40, 41 and 42 which may be in the form of headed bolts extending through openings in the base 11 with the upper ends thereof threaded into the ring 34, so that the shield 28 may be clamped between the frame or housing 27 and the base 11.

In accordance with a specific feature of the invention, at least one of the support rods, such as the rod 41, is hollow and wires 43 and 44 extend from terminals 45 and 46 in the base 11 through the rod 41 to terminals 47 and 48, respectively, of a connector 49 arranged to be connected to the filament of the sealed beam unit 13. Thus, the rod 41 serves the dual function of supporting the housing or frame 27 and protecting the connecting wires 43 and 44.

It will be appreciated that with this construction of the warning light 10, a compact light of high efficiency is provided. The sealed beam unit 13 is stationary and no slip rings or the like are required for energization of the light source. The parts are supported in firm assembly with the reflecting surfaces of the unit 14 being protected. Replacement of the sealed beam unit 13 is very simple. The thumb screw 37 is removed, the cover 35 opened, the connector 49 disconnected, the old unit lifted out, after which the new unit is seated in the ring 31, the connector 49 is reconnected, the cover 35 is closed and the thumb screw 37 is replaced and tightened.

Referring now to Figures 3 and 4, reference numeral 50 generally designates a modified warning light constructed according to the principles of this invention. The warning light 50 is in most respects identical to the warning light 10 as above described and like reference numerals are therefor applied to like elements. The warning light 50 differs from the light 10 in the addition of a shutter generally designated by reference numeral 51 which comprises a horizontal base 52 and a vertical segmental cylindrical opaque wall 53 secured to the base 52 and having terminal edges 54 and 55 displaced from each other approximately 90° with respect to the axis of rotation of the unit 14 so that the wall 53 extends for approximately 270° about such axis.

The shutter 51 is supported from the shaft 20 through a bearing assembly 56 comprising an outer annular bearing member 57 secured to the base 52 and an inner annular bearing member 58 secured to the shaft 20, the bearing members 57 and 58 respectively having inwardly and outwardly facing bearing races between which ball bearings 59 are confined.

While the frictional forces in the bearing assembly 56 are very small, sufficient torque is developed to cause the shutter 51 to rotate in the direction of rotation of the shaft 20 if the rotation of the shutter 51 is not otherwise impeded. According to this invention, stop means are provided to limit counter-clockwise rotation of the shutter 51 in a position as illustrated in full lines in Figure 3 and to limit clockwise rotation of the shutter 51 in a diametrically opposite position illustrated in dotted lines in Figure 3. In particular, a pin 60 depending from the base 52 of the shutter 51 is arranged to engage the stop member 61 projecting upwardly from the base 11 to limit counter-clockwise rotation of the shutter 51 and the pin 60 engages a stop 62 projecting upwardly from the base 11 to limit clockwise rotation of the shutter 51.

Accordingly, when the shaft 20 is rotated in a counter-clockwise direction as viewed in Figure 3, the shutter 51 will be moved to a position as illustrated in full lines in Figure 3 and the light will be projected only to the left as viewed in Figure 3. With clockwise rotation of the shaft 20, the shutter will be rotated to the position in which the pin 60 engages the stop 62 as illustrated in dotted lines in Figure 3 and the light will be projected only to the right.

A circuit for reversibly energizing the motor 24 is illustrated diagrammatically in Figure 5. The motor 24 may be a direct current type of motor having an armature 63 and a field winding 64. The field winding 64 is connected between terminals 65 and 66 which may be connected to a suitable source of direct current and the terminals of the armature 63 are connected to movable contacts 67 and 68 of a double pole-double throw switch, the movable contacts 67 and 68 being selectively engageable here with fixed contacts 69 and 70 or fixed contacts 71 and 72. The contacts 69 and 72 are connected to the terminal 65 while the contacts 70 and 71 are connected to the terminal 66 so that in one position of the movable contacts 67, 68 the current will flow in one direction through the armature 63 and in the other position of the contacts, the current will flow in the reverse direction, so that the motor will rotate in a direction depending upon the position of the contacts 67 and 68. It will be appreciated that the switch may be at a remote location with respect to the warning light 50.

It will be understood that modifications and variations may be effected without departing from the spirit and scope of the novel concepts of the present invention.

We claim as our invention:

1. A warning light for use with a sealed beam light unit of the type having an annular rim, comprising: a base, a shaft projecting from said base and journalled thereby for rotation about its axis, a motor drivingly connected to said shaft, a reflector unit carried by said shaft, a ring supported in spaced relation from said base in a plane transverse to said axis and having an opening coaxially related to said shaft and of slightly smaller diameter than the annular rim of the light unit to receive the same thereagainst, and releasable means for resiliently holding the light unit seated in said opening of said ring so that the center line of the light beam coincides with said axis, said reflector unit including at least one reflecting surface arranged in the path of light from the light unit to reflect light in a direction generally transverse to said axis.

2. A warning light for use with a sealed beam light unit of the type having an annular rim, comprising: a base, a shaft projecting from said base and journalled thereby for rotation about its axis, a motor drivingly connected to said shaft, a reflector unit carried by said shaft, a ring supported in spaced relation from said base in a plane transverse to said axis and having an opening coaxially related to said shaft and of slightly smaller diameter than the annular rim of the light unit to receive the same thereagainst, a generally cup-shaped cover releasably secured on said ring, and resilient means on said cover for holding the light unit seated in said opening of said ring so that the center line of the light beam coincides with said axis, said reflector unit including at least one reflecting surface arranged in the path of light from the light unit to reflect light in a direction generally transverse to said axis.

3. A warning light for use with a sealed beam light unit of the type having an annular rim, comprising: a base, a shaft projecting from said base and journalled thereby for rotation about its axis, a motor drivingly connected to said shaft, a reflector unit carried by said shaft, a ring supported in spaced relation from said base in a plane transverse to said axis and having an opening coaxially related to said shaft and of slightly smaller diameter than the annular rim of the light unit to receive the same thereagainst, a generally cup-shaped cover hingedly supported on said ring, and resilient means on said cover for holding the light unit seated in said opening of said ring so that the center line of the light beam coincides with said axis, said reflector unit including at least one reflecting surface arranged in the path of light from the light unit to reflect light in a direction generally transverse to said axis.

4. In a warning light, a base, a shaft projecting from said base and journalled thereby for rotation about its axis, a motor drivingly connected to said shaft, a reflector unit secured to said shaft and including at least one reflecting surface at an angle to said axis, a cylindrical shield of light-transmitting material disposed on said base in coaxial relation to said shaft, a support frame supported in spaced relation to said base by said shield, and a light source supported on said frame to project a beam of light toward said reflector unit with the center line of the beam coinciding with said axis.

5. In a warning light, a base, a shaft projecting from said base and journalled thereby for rotation about its axis, a motor drivingly connected to said shaft, a reflector unit secured to said shaft and including at least one reflecting surface at an angle to said axis, a cylindrical shield of light-transmitting material disposed on said base in coaxial relation to said shaft, a support frame supported in spaced relation to said base by said shield, a light source supported on said frame to project a beam of light toward said reflector unit with the center line of the beam coinciding with said axis, a first resilient gasket between said shield and said base, a second gasket between said shield and said frame, and means for adjustably moving said frame toward said base.

6. In a warning light, a continuously rotatable unit, means in said unit for projecting a beam of light transversely with respect to the axis of rotation thereof, a shutter supported for movement about said axis, means coupling said unit to said shutter to exert a limited drive torque to said shutter, first stop means for limiting rotation of said shutter in one direction, second stop means for limiting rotation of said shutter in the reverse direction, a reversible electric motor coupled to said unit to rotate the same about said axis, and means for selectively energizing said motor to selectively rotate said motor in opposite directions and selectively actuate said shutter into either of two positions, said unit being continuously rotatable by said motor in either direction by virtue of the limited drive torque exerted between said shutter and said unit.

References Cited in the file of this patent

UNITED STATES PATENTS

| | | |
|---|---|---|
| 999,913 | Losey | Aug. 8, 1911 |
| 1,417,457 | Cook | May 23, 1922 |
| 2,559,339 | Blease et al. | July 3, 1951 |
| 2,578,239 | Gosswiller | Dec. 11, 1951 |
| 2,719,282 | Roth | Sept. 27, 1955 |
| 2,724,100 | Hastings | Nov. 15, 1955 |
| 2,748,371 | Wilcox et al. | May 29, 1956 |

FOREIGN PATENTS

| | | |
|---|---|---|
| 25,505 | Great Britain | Nov. 20, 1902 |
| 28,297 | Great Britain | Dec. 7, 1912 |